United States Patent [19]
Gropper et al.

[11] 3,873,216
[45] Mar. 25, 1975

[54] CALIBRATION OF PHOTOELECTRIC SCANNER FOR ANALYTICAL ULTRACENTRIFUGE

[75] Inventors: Lee Gropper, Los Altos Hills; Walter W. Thurber, San Jose, both of Calif.

[73] Assignee: Beckman Instruments, Inc., Sullerton, Calif.

[22] Filed: Mar. 19, 1973

[21] Appl. No.: 342,470

[52] U.S. Cl. .................................. 356/243, 350/274
[51] Int. Cl. ............................................... G01j 1/02
[58] Field of Search ......................... 350/271–275, 350/162; 356/243, 196; 73/1 R; 250/237

[56] References Cited
UNITED STATES PATENTS
| | | | |
|---|---|---|---|
| 2,273,121 | 2/1942 | List | 356/25 |
| 3,127,464 | 3/1964 | Gustavson | 73/1 R |
| 3,553,466 | 1/1971 | Johnston et al. | 250/237 |

Primary Examiner—William L. Sikes
Attorney, Agent, or Firm—R. J. Steinmeyer; F. L. Mehlhoff

[57] ABSTRACT

A photoelectric scanner associated with an ultracentrifuge can be calibrated by rotating in the ultracentrifuge a sample cell having, in place of a centerpiece containing sample solution, a disc having two slits, one slit having substantially uniform width, the other slit having stepwise graduated width, and comparing the output signal of the scanner with the known differences in width between the two slits of the disc.

4 Claims, 3 Drawing Figures

CALIBRATION OF PHOTOELECTRIC SCANNER FOR ANALYTICAL ULTRACENTRIFUGE

BACKGROUND OF THE INVENTION

Analytical ultracentrifuges are used to study the distribution of molecules in solution under the influence of a centrifugal force. A solution of the molecules to be studied is placed in a cell having optical windows. The cell is then inserted into a rotor in the ultracentrifuge and rotated at high speeds, generating centrifugal forces which cause the molecules to move outward and form concentration gradients. For molecules which absorb ultraviolet light, the concentration gradient can be determined by passing ultraviolet light through the cell and observing the resulting light-dark gradient corresponding to the concentration gradient. The light-dark gradient can be observed directly, as on a photographic plate, but normally the ultraviolet light, after passing through the cell, is received by a photoelectric scanner which converts the ultraviolet light to an electrical signal whose amplitude varies as a function of the concentration distribution of the sample. The electrical signal is then translated into a graphical representation of the concentration gradient in the cell. However, in order to provide an accurate graphical representation of the concentration gradient, the photoelectric scanner must be calibrated.

SUMMARY OF THE INVENTION

This invention provides a convenient device and method for absolute calibration of a photoelectric scanner for an analytical ultracentrifuge. The device comprises a disc having two slits, one slit having a substantially uniform width, the other slit having a stepwise graduated width. The disc is incorporated into the assembly of a sample cell for an analytical ultracentrifuge in place of the centerpiece of the sample cell.

A sample cell for an analytical ultracentrifuge normally comprises a centerpiece having sectors for containing solvent and a sample solution to be studied, windows adjacent each side of the centerpiece, holders for the windows, and a housing for the elements of the cell. A typical sample cell is described in U.S. Pat. No. 3,391,597 to Gropper, assigned to the same assignee as the present application.

To study the distribution of molecules in the sample solution under the influence of a centrifugal force, the cell is placed in the rotor of an ultracentrifuge and rotated at high speeds. The resultant concentration gradient in the sample is determined by passing ultraviolet light through the cell and detecting the light passing through the cell by a photoelectric scanner. The scanner has a narrow slit for receiving ultraviolet light. The slit is stationary in the direction of rotation of the rotor, but is movable in the radial direction of the rotor. In moving along the radial direction of the rotor, the slit scans the cell. Being narrow, the slit receives light from only a small area of the cell at any one time. Thus, in the time it takes the slit to scan the cell, the slit normally receives from several hundred to several thousand different images of the cell, depending on the rotor speed and the scan rate. During each rotation of the rotor, the slit receives two images (inputs of light), one from the solvent sector and one from the sample sector. The electrical signals generated by the two images are combined and one is subtracted from the other to produce an output signal representing the difference in intensity between the two images. The value of the output signal is recorded on a graph to indicate the concentration of the sample at that location in the cell. The operation of an analytical ultracentrifuge and an associated photoelectric scanner is fully described in U.S. Pat. No. 3,470,381 to Boyd, assigned to the same assignee as the present application.

In accordance with this invention, the photoelectric scanner is calibrated by inserting into the rotor of an analytical ultracentrifuge a sample cell having, in place of the centerpiece, a disc having two slits, one slit having substantially uniform width, the other slit having stepwise graduated width, the length of each step being greater than the width of the slit of the scanner, rotating the sample cell in the ultracentrifuge, passing ultraviolet light through the rotating sample cell, moving the slit of the scanner radially with respect to the rotor, receiving and processing in the scanner light passing through the cell to produce electrical signals representative of the differences in the intensity of the light transmitted by the slits of the disc, recording the electrical signals, and comparing the value of the electrical signals with the corresponding differences in width between the two slits of the disc.

DETAILED DESCRIPTION

Figure 1:
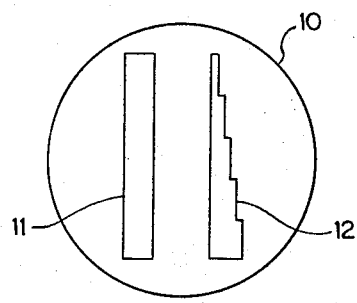
FIG. 1 is a view of a disc for calibrating a photoelectric scanner in accordance with this invention.

FIG. 1 shows a disc 10 made of an opaque material and having two slits 11 and 12. One slit 11 has a uniform width and the other slit 12 has a stepwise graduated width.

In operation, the disc 10 is incorporated into a conventional sample cell for an analytical ultracentrifuge in place of the centerpiece of the sample cell. The cell is then placed in a rotor of an ultracentrifuge and rotated. As the cell rotates, it moves past the slit of a photoelectric scanner.

Figure 2:
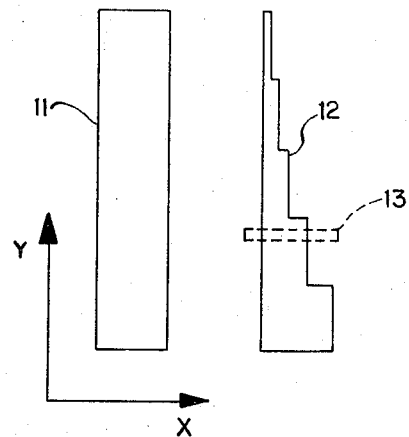
FIG. 2 is a view of the two slits of the disc with the slit of the photoelectric scanner superimposed thereon.

FIG. 2 shows the slit 13 of the photoelectric scanner at a moment when the slit 13 is over the stepwise graduated slit 12 of the disc 10. The slit 13 is stationary in the direction of rotation of the cell (indicated by the arrow designated by the letter X in FIG. 2), but moves slowly in the radial direction of the rotor (indicated by the arrow designated by the letter Y in FIG. 2). As the slit 13 moves along the radial direction of the rotor, it scans the cell. During each rotation of the rotor, the slit 13 receives ultraviolet light successively from the two slits 11, 12 of the disc 10. To avoid overlap between the two transmissions of light, the distance between the two slits 11, 12 is greater than the length of the slit 13 of the scanner. Similarly, the length of each step of the graduated slit 12 is greater than the width of the slit 13 of the scanner.

Figure 3:
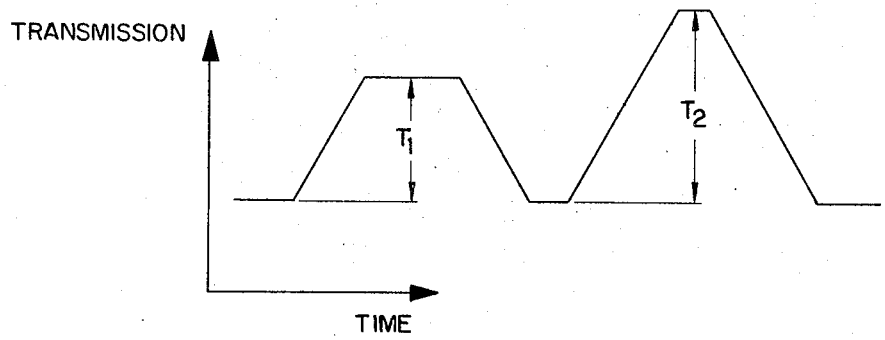
FIG. 3 illustrates the transmission of light received by the scanner during one rotation of the disc past the slit of the photoelectric scanner in the condition shown in FIG. 2.

The transmission of light through the slit 13 at a given instant is proportional to the mutual area of the slit 13 and the particular slit of the disc 10 under the slit 13 at that instant. As may be seen cell FIG. 3, in which is shown the transmission through the slit 13 for one rotation of the cell with the slit 13 of the scanner positioned in the Y direction as shown in FIG. 2, the peak transmissions $T_1$ and $T_2$ are proportional to the respective widths of the slits 11, 12 in the area covered by the slit 13 of the scanner. Since the output signal of the scanner is directly related to the peak transmissions, the output signal, which is graphically recorded, corresponds to the difference in widths between the two slits 11, 12 of the disc 10. By correlating the output of the scanner with the widths of the slits 11, 12, which can be accurately measured, the scanner can be absolutely calibrated. For example, the output of the scanner for the respective stepwise graduations of the slit 12 produces reference points which can be used to measure, on a fixed scale, the relative transmission of light during an actual ultracentrifuge run using a cell containing a sample being studied. Thus, the invention provides a convenient device and method for absolute calibration of a photoelectric scanner associated with an analytical ultracentrifuge.

What is claimed is:

1. A method of absolute calibration of a photoelectric scanner associated with an analytical ultracentrifuge, the ultracentrifuge having a rotor into which a sample cell having a centerpiece containing sample solution is normally inserted, and the scanner having a slit for receiving ultraviolet light, the slit being stationary with respect to the direction of rotation of the rotor and movable in the radial direction of the rotor, which method comprises inserting into the rotor a sample cell having, in place of the centerpiece, a disc having two slits, one slit having substantially uniform width, the other slit having stepwise graduated width, the length of each step being greater than the width of the slit of the scanner, rotating the sample cell in the ultracentrifuge, passing ultraviolet light through the rotating sample cell, moving the slit of the scanner radially with respect to the rotor, receiving and processing in the scanner light passing through the cell to produce electrical signals representative of the differences in the intensity of the light transmitted by the slits of the disc, recording the electrical signals, and comparing the value of the electrical signals with the corresponding differences in width between the two slits of the disc.

2. A device for absolute calibration of a photoelectric scanner associated with an analytical ultracentrifuge, the ultracentrifuge having a rotor into which a sample cell having a centerpiece containing sample solution is normally inserted, and the scanner having a slit for receiving ultraviolet light, the slit being stationary with respect to the direction of rotation of the rotor and movable in the radial direction of the rotor, which device comprises a disc having two slits, one slit having a substantially uniform width, the other slit having substantially stepwise graduated width, the disc being capable of being incorporated into the sample cell in place of the centerpiece normally present therein, whereby, when the disc is rotated past the slit of the scanner, the peak transmissions of light through the slit of the scanner are proportional to the widths of the respective slits of the disc, thereby permitting calibration of the scanner by comparison of the output of the scanner with the corresponding known differences in width between the respective portions of the two slits of the disc.

3. The device of claim 2 wherein the length of each step of the graduated slit is greater than the width of the slit of the scanner.

4. The device of claim 3 wherein the distance between the slits of the disc is greater than the length of the slit of the scanner.

* * * * *